(12) United States Patent
Clevorn

(10) Patent No.: US 9,432,969 B1
(45) Date of Patent: Aug. 30, 2016

(54) SHAPE CHANGING DEVICE HOUSING

(71) Applicant: Intel IP Corporation, Santa Clara, CA (US)

(72) Inventor: Thorsten Clevorn, Munich (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/752,899

(22) Filed: Jun. 27, 2015

(51) Int. Cl.
*H04B 1/38* (2015.01)
*H04W 68/02* (2009.01)
*H04M 1/02* (2006.01)
*H04M 1/725* (2006.01)

(52) U.S. Cl.
CPC ........... *H04W 68/02* (2013.01); *H04M 1/0206* (2013.01); *H04M 1/72519* (2013.01)

(58) Field of Classification Search
CPC . H04M 19/04; H04M 1/72519; H04M 88/02
USPC ............................ 455/567, 557, 550.1, 575.1
See application file for complete search history.

(56) References Cited

U.S. PATENT DOCUMENTS

| 6,850,773 B1* | 2/2005 | Ghassabian | G04G 21/04 379/433.1 |
| 7,003,316 B1* | 2/2006 | Elias | G06Q 20/20 455/11.1 |
| 9,030,318 B1* | 5/2015 | Baldwin | G08B 3/10 340/539.1 |
| 2003/0050039 A1* | 3/2003 | Baba | H04M 1/72538 455/404.1 |
| 2011/0194713 A1* | 8/2011 | Apfel | H04R 25/43 381/314 |
| 2015/0126113 A1* | 5/2015 | Cech | H04B 5/0012 455/41.1 |

* cited by examiner

*Primary Examiner* — Danh Le
(74) *Attorney, Agent, or Firm* — Grossman, Tucker, Perreault & Pfleger, PLLC

(57) ABSTRACT

An electronic device housing may transition from a first physical configuration to one or more second physical configurations responsive to receiving one or more notifications. Each of the second physical configurations may be logically associated with a respective one of the one or more notifications. A physical configuration controller may receive one or more notifications and select a second physical configuration logically associated with each of the one or more notifications. The physical configuration controller may generate one or more outputs that cause the physical displacement of one or more actuateable devices to transition the electronic device housing from the first physical configuration to the second physical configuration.

23 Claims, 9 Drawing Sheets

US 9,432,969 B1

SHAPE CHANGING DEVICE HOUSING

TECHNICAL FIELD

The present disclosure relates to shape changing housings for electronic devices.

BACKGROUND

Many electronic devices provide notifications to alert the device user to an event occurrence. For example, most cellular telephones will either cause a light emitting diode (LED) to flash intermittently or will cause the device housing to vibrate to alert the user to a missed call, a new voicemail message, a new email, or a new SMS message. Given the relatively limited power of most portable electronic device batteries, these notifications preferably consume minimal power since there may be a considerable delay between the time the first notification is provided and the time that the device user becomes aware of the notification. Such considerations often preclude delivery of notifications in the form of a message that is continuously displayed on the device's user interface.

Prior notifications have been delivered in several ways. Some devices may provide an audible notification, such as by playing a sound, tune or tone, upon occurrence of a particular event. Such audible notifications suffer the drawback that the sound may not play if the user places the device in a SILENT mode. Such audible notifications also suffer the drawback of repeating the sound on a periodic basis that increases power consumption of the device. Some devices may provide a tactile notification, such as a vibration, upon occurrence of a particular event. Once again, such tactile notifications suffer the drawback of repeating the vibration on a periodic basis that increases the power consumption of the device. In addition, such tactile notifications may be missed by the user if the device is placed in a location that may be visible to the user, but is not in close proximity or contact with the user's body. Some devices may provide a visual notification, such as a blinking light emitting diode (LED), upon occurrence of a particular event. Such visual notifications require the user be in a line of sight of the indicator. If the device is face down on a table or in a user's pocket, such visual notifications may go unnoticed for quite some time.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
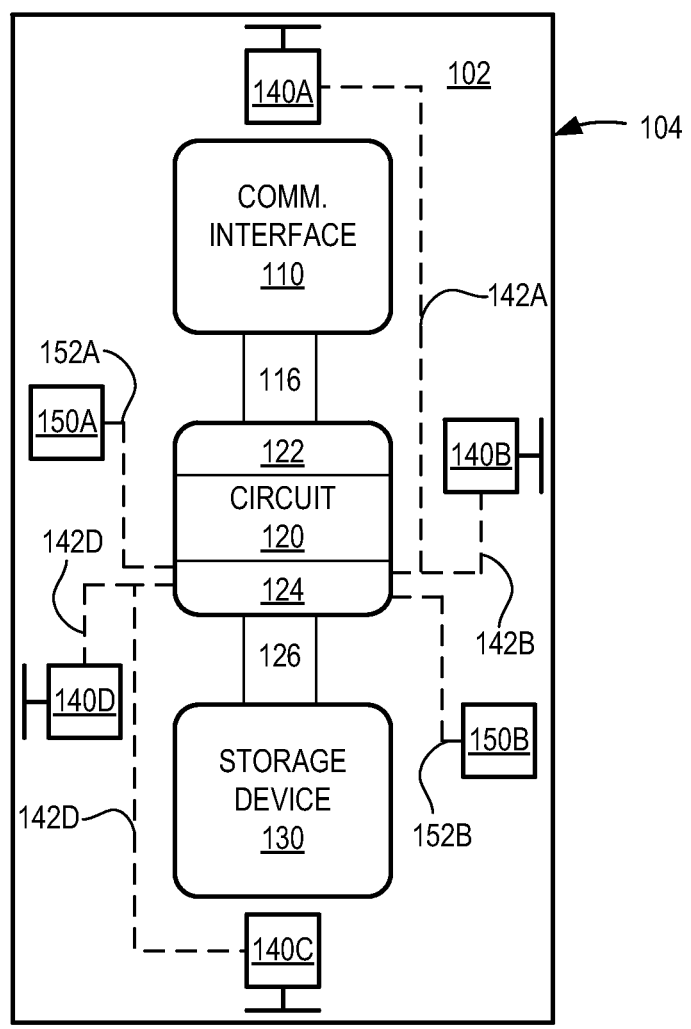
FIG. 1 illustrates an example shape-changing electronic device housing, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A shape-changing electronic device housing may change from a first physical configuration to any of a number of second physical configurations responsive to the receipt of one or more cellular signals by a physical configuration controller communicably coupled to a number of actuateable elements operably coupled to the electronic device housing. In some instances, the physical configuration controller may cause the actuateable elements to change the shape of the housing from a flat first physical configuration (e.g., flat) to a second physical configuration (e.g., a arc or curve) responsive to the receipt of a notification signal. Responsive to the user's failure to acknowledge one or more events, a device controller may generate the notification signal. For example, the device controller may generate a notification signal responsive to a user's failure to acknowledge an incoming call, a user's failure to open a new email message, a user's failure to open a new SMS message, or similar. In some implementations, the physical configuration controller may generate different second physical configurations corresponding to different event occurrences. In some implementations, the resistance encountered by one or more actuateable elements while transitioning from the first physical configuration to the second physical configuration may cause the physical configuration controller to abandon the transformation if the resistance exceeds a predetermined threshold value. For example, if a book is placed on top of the device, the physical configuration controller may abandon the transformation if the resistance provided by the weight of the book exceeds a defined threshold value. In some instances, the user may manually transition the portable electronic device from the second physical configuration to the first physical configuration to acknowledge receipt of the notification.

Changing the physical configuration of the device housing is particularly advantageous in that the notification provides a haptic or tactile indication as well as a visual indication of the occurrence of the event. The device user is therefore able to feel the transition of the device from the first physical configuration to the second physical configuration when carrying the device and may also see the physical transformation of the device from the first physical configuration to the second physical configuration when the device is placed on a surface such as a desk, table, or nightstand. In some implementations, the physical transformation of the device from the first physical configuration to the second physical configuration may also reduce energy consumption since many actuateable elements draw power only when in the process of moving from one physical configuration to another physical configuration.

A physically transformable housing for an electronic device is provided. The physically transformable housing may include a housing including an exterior surface having a first physical configuration that facilitates a use of the electronic device by a user. The physically transformable housing may further include a number of actuateable elements operably coupled to at least a portion of the exterior surface of the housing. The physically transformable housing may include a circuit disposed in the housing, the circuit communicably coupled to each of the number of actuateable elements and a storage device communicably coupled to the circuit. The storage device may include at least one of data or machine-readable instructions that, when executed by the circuit cause the circuit to provide a physical configuration controller, the physical configuration controller to: receive a notification that includes data indicative of an event, the notification in response to a failure to receive, at the electronic device, an input acknowledging an occurrence of the event, determine a second physical configuration of the housing logically associated with the event, and generate an output for at least one of the number of actuateable elements, the output to cause the displacement of the at least one actuateable element and transition the housing from the first physical configuration to the second physical configuration.

A method of transitioning a housing for an electronic device from a first physical configuration to a second physical configuration is provided. The method may include executing, by a circuit, a set of machine-readable instructions stored on a communicably coupled storage device, the machine-readable instructions, when executed, causing the circuit to provide at least a physical configuration controller. The method may further include receiving, by a physical configuration controller, a notification that includes data indicative of an event, the notification in response to a failure to receive, at the electronic device, an input acknowledging an occurrence of the event. The method may additionally include determining, by the physical configuration controller, a second physical configuration of the housing logically associated with the event. The method may further include generating, by the physical configuration controller, an output for at least one of the number of actuateable elements.

A physically convertible portable cellular communication device is provided. The device may include a housing having an external surface. The device may further include a transceiver to receive at least one of a number of signals, the transceiver at least partially disposed in the housing. The device may additionally include an actuateable element to reversibly physically configure all or a portion of the external surface of the housing from a first physical configuration to a second physical configuration responsive to the receipt of the at least one signal by the transceiver, the second physical configuration logically associated with the at least one received signal.

A system for transitioning a housing for an electronic device from a first physical configuration to a second physical configuration is provided. The system may include a means for receiving a number of notifications, each of the notifications including data indicative of a respective event, each of the number of notifications in response to a failure to receive, at the electronic device, an input acknowledging an occurrence of the respective event. The system may additionally include a means for determining a second physical configuration logically associated with the notification. The system may further include a means for generating an output for at least one of the number of actuateable elements to transition an exterior surface of the housing from the first physical configuration to the second physical configuration.

FIG. 1 illustrates an example shape-changing electronic device housing 100, in accordance with at least one embodiment of the present disclosure. The shape-changing electronic device housing 100 includes a housing 102 having an exterior surface 104. The housing 102 may include one or more interior spaces or voids disposed proximate an interior surface of the housing 102. The space or void of the housing 102 may wholly or partially contain or otherwise include one or more communications interfaces 110, one or more circuits 120, and one or more storage devices 130. The one or more circuits 120 execute a number of machine-readable instruction sets that cause the one or more circuits 120 to be apportioned or otherwise allocated to one or more specialized device controllers 122 and one or more physical configuration controllers 124. The one or more physical configuration controllers 124 are operably and communicably coupled to one or more actuateable elements 140A-140D (collectively, "actuateable elements 140"). Some or all of the actuateable elements act on the housing 102 to transform the housing 102 from a "base" first physical configuration to any of a number of second physical configurations that are evident based on a physical displacement of the exterior surface 104 of the housing 102.

The electronic device 100 can include any number or combination of systems, devices, subsystems, or modules partially or completely disposed in the housing 102. In some implementations, the electronic device 100 may include a portable electronic device such as a personal digital assistant, handheld gaming console, or similar device capable of receiving radio frequency signals. In at least some implementations, the portable electronic device may include a cellular communication device such as a smartphone or similar.

The housing 102 includes an exterior surface 104 that can be altered from a first physical configuration to at least a second physical configuration. In embodiments, at least a portion of the housing may include a flexible or similarly non-rigid construction that permits the housing 104 to assume at least the first physical configuration and the second physical configuration. In some instances, the housing 102 may include one or more hinged or movably connected portions or segments that permit the housing 102 to assume at least the first physical configuration and the second physical configuration. In some instances the housing 102 may include one or more panels that pivot, rotate, project, recess, tilt, twist, bend, displace, or are otherwise moveable or non-permanently deformable to permit the housing 102 to reversibly transition between at least a first physical configuration and one or more second physical configuration(s).

The housing 102 may be fabricated using one or more materials including, but not limited to: metals, plastics, carbon fiber, shape change alloys, elastomeric materials, resilient materials, or combinations thereof. The housing 102 may include one or more hinged sections, portions, or elements that rotate through an arc measured with respect to another section, portion or element included in the housing. The housing 102 may include one or more flexible circuit boards, power supplies, or display elements including, but not limited to, one or more flexible liquid crystal display (LCD) or light emitting diode (LED) touchscreen displays that function as a user interface providing the user with both the ability to input data to the device controller 122 or the physical configuration controller 124 and the ability to receive output data from the device controller 122 or the physical configuration controller 124.

The electronic device 100 includes one or more communication interfaces 110 capable of receiving signals from one or more other devices. The one or more communication interfaces 110 may include, but are not limited to, any number of transmitters, receivers, or transceivers capable of transmitting or receiving radio frequency (RF) electromagnetic radiation (i.e., electromagnetic radiation within a frequency band of 3 kHz to 300 GHz). The one or more communication interfaces 110 may include, but are not limited to: one or more cellular interfaces (e.g., global system for mobile communications or GSM interface, a code division multiple access or CDMA interface, a 3G interface, a 4G interface, a long term evolution or LTE interface, and the like); one or more BLUETOOTH® interfaces, one or more IEEE 802.11 or Wi-Fi interfaces, one or more near field communication or NFC interfaces, or combinations thereof. The one or more communications interfaces 110 may bidirectionally communicably couple to the one or more circuits 120 via one or more busses 116.

The one or more circuits 120 can include any combination or number of hardware devices capable of executing one or more machine-readable instruction sets. When executed, the one or more machine-readable instruction sets cause all or a portion of the one or more circuits 120 to provide a device controller 122.

When executed by the one or more circuits 120, the one or more machine-readable instruction sets cause all or a portion of the one or more circuits 120 to provide a physical configuration controller 124. The physical configuration controller 124 is communicably coupled to the actuateable devices 112 and causes the actuateable devices 112 to one or more positions thereby transforming the electronic device housing 102 from the first physical configuration to the second physical configuration. In some instances, a first portion of the one or more circuits 120 may provide the device controller 122 and a second portion of the one or more circuits 120 may provide the physical configuration controller 124. In some instances, a first circuit of a plurality of circuits 120 may provide the device controller 122 and a second circuit of the plurality of circuits 120 may provide the physical configuration controller 124.

The one or more circuits 120 can include any number or combination of circuit elements and may or may not include one or more logic elements such as binary logic gates or the equivalent thereof. The one or more circuits 120 may include, but are not limited to, one or more SNAPDRAGON® processors (Qualcomm, Inc., San Diego, Calif.), one or more ATOM™ or CORE™ processors (Intel, Inc., Santa Clara, Calif.), one or more A6, A8, or A10 processors (Apple, Inc., Cupertino, Calif.), one or more TEGRA® processors (nVidia, Inc., Santa Clara, Calif.), or similar. The one or more circuits 120 may include, but are not limited to, one or more digital signal processors (DSPs), one or more application specific integrated circuits (ASICs), one or more field programmable gate arrays (FPGAs), one or more controllers, one or more single- or multi-core processors, or combinations thereof.

In embodiments, the device controller 122 may control or otherwise administer the operational functions of the electronic device, for example via one or more operating systems such as Windows 10 (Microsoft, Inc., Redmond, Wash.), Android (Google, Inc., Palo Alto, Calif.), and iOS (Apple, Inc., Cupertino, Calif.). In embodiments, the device controller 122 may control or otherwise administer some or all of the basic input/output (I/O) functions for the portable electronic device 100.

In embodiments, the physical configuration controller 124 controls at least the transition of the electronic device housing 102 from the first physical configuration to the second physical configuration. The device controller 122 and the physical configuration controller 124 may, on occasion, be executed as individual threads by a circuit 120 such as a multi-core processor. The device controller 122 and the physical configuration controller 124 may, on occasion, be executed as hyper-threads by a circuit 120 such as a single core processor or as a thread on a core of a multi-core processor. The one or more circuit 120 may communicably couple to one or more storage devices 130 via one or more busses 126. In some implementations, the one or more busses 116 may be the same as the one or more busses 126.

The one or more storage devices 130 may include any number or combination of devices capable of storing or otherwise retaining data. In some implementations, at least a portion of the one or more storage devices 130 may include one or more magnetic storage devices, one or more optical storage devices, one or more electrostatic storage devices, one or more electro-resistive storage devices, one or more atomic storage devices, one or more quantum storage devices, or combinations thereof. In embodiments, the one or more storage devices 130 may store or otherwise retain data representative of logical associations between one or more signals received at the communications interface 110 and a corresponding second physical configuration of the electronic device housing 100.

The physical configuration controller 124 communicably couples to each of a number of actuateable elements 140. The actuateable elements 140 may include any number or combination of devices or systems capable of causing the translation, rotation, or any other movement of the housing 104. In some implementations, some or all of the actuateable elements 140 may include systems or devices that are separate from the housing 104 but physically and operationally coupled to the housing 104 by one or more mechanical fixtures or one or more chemical or thermal adhesives. Non-limiting examples of such systems or devices that are separate from the housing include piezoelectric actuators, motorized actuators, linear actuators, rotational actuators, thermal actuators, magnetic actuators, electro-mechanical actuators, or combinations thereof.

In some implementations, some or all of the actuateable elements 140 may include systems, components, or devices that are integral to at least a portion of the housing 104. A non-limiting example of such a system, component, or device integral to at least a portion of the housing include one or more shape change alloys integrated into the housing 104. Such shape-changing alloys transition from a first physical configuration in the absence of an electric current to a second physical configuration in the presence of an electric current.

The physical configuration controller 124 generates any number of output signals 142A-142D (collectively, "output signals 142"), each of the output signals 142A-142D are communicated to a respective one of the actuateable elements 140A-140D. The output signals 142 may include one or more analog signals or one or more digital signals. Each of the number of actuateable elements 140 may receive power from a power supply such as a primary or a secondary battery carried by the portable electronic device 100. In some implementations, at least some of the actuateable elements 140 may be a "fail in position" type device in which the actuateable element draws power only while transitioning between states or positions. Such "fail in position" type actuateable elements 140 offer the advantage of a low power draw since power is consumed only when transitioning the actuateable elements 140 between states or positions.

In some implementations, the device controller 122 or the physical configuration controller 124 may measure the current or power drawn by some or all the actuateable elements 140 as the housing 104 transitions from the first physical configuration to the second physical configuration. If the device controller 122 or the physical configuration controller 124 detects a current or power draw by one or more of the actuateable elements 140 exceeds a defined threshold, the device controller 122 or the physical configuration controller 124 may abandon the shape-change operation to avoid an excessive power draw on the device power supply (i.e., battery) or to avoid potential damage to the actuateable elements 140 or the device housing 104.

In some implementations one or more sensors 150A-150B (collectively, "sensors 150") may be communicably coupled to the circuit 120. Each of the sensors 150A-150B produces a respective output signal 152A-152B that is received by the circuit 120. The sensors 150 may include any number or combination of devices or systems capable of providing a signal 152 that includes data indicative of one or more environmental conditions to the circuit 120. In some instances, some or all of the sensors 150 may be communicably coupled to the device controller 122 and in other instances, some or all of the sensors 150 may be communicably coupled to the physical configuration controller 124. In some embodiments, the sensors 150 may include one or more stress or strain gauges capable of measuring the amount of physical resistance encountered by the actuateable elements 140 as the actuateable elements 140 transition the housing 104 from the first physical configuration to the second physical configuration.

In some implementations, the device controller 122 or the physical configuration controller 124 may compare the resistance measured by the sensors 150 as the housing 104 is transitioning from the first physical configuration to the second physical configuration against one or more defined thresholds. If the resistance measured by one or more of the sensors 150 exceeds a defined threshold resistance value, the physical configuration controller 124 may abort the transition from the first physical configuration to the second physical configuration. For example, if the electronic device 100 is placed beneath a heavy object such as a book, the actuateable elements 140 may be incapable of developing sufficient force to lift the heavy object during the transition from the first physical configuration to the second physical configuration. Attempting to do so may cause damage to one or more actuateable elements 140. To avoid incurring such damage, the physical configuration controller 124 may abandon the transition from the first physical configuration to the second physical configuration if the resistance measured by the one or more sensors 150 exceeds a defined threshold value.

Figure 2A:
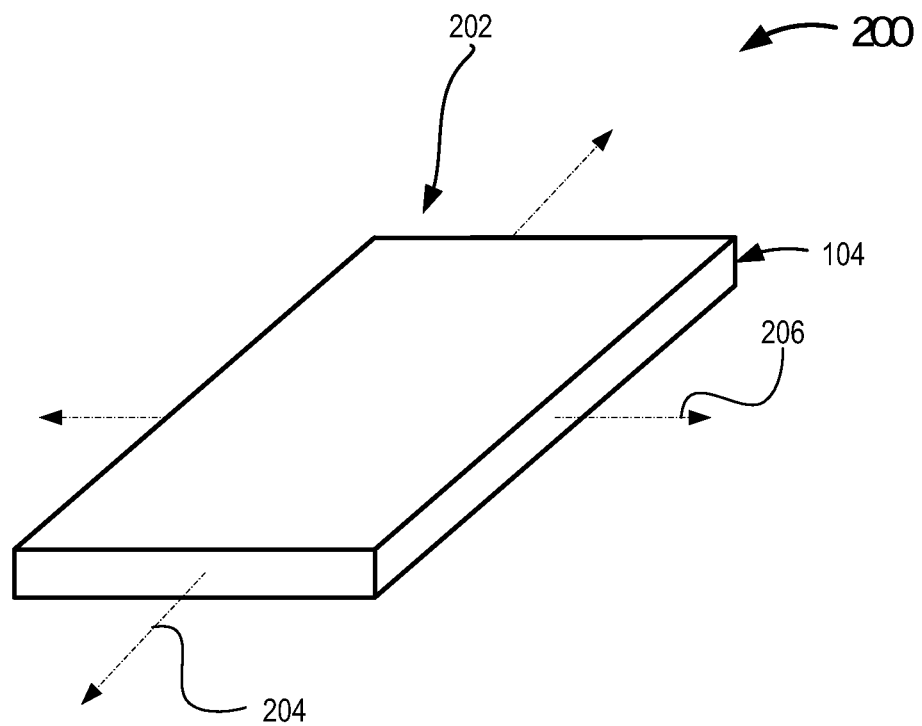
FIG. 2A illustrates an example shape-changing device housing in a first physical configuration in the absence of any notifications, in accordance with at least one embodiment of the present disclosure.

FIG. 2A is a perspective view of an illustrative device housing 104 in a first physical configuration 202, in accordance with at least one embodiment of the present disclosure. As illustrated in FIG. 2A, the housing 104 is in the form of a "candybar" format smartphone or similar electronic device 200 that is planar along a first, longitudinal, axis 204 and planar along a second, lateral, axis 206. Although depicted as a planar object, those of skill in the art will readily appreciate a housing 104 having virtually any shape or configuration may be transitioned from a first physical configuration to a second physical configuration using the systems and methods described in detail herein. As such, embodiments using non-planar device housings may be considered as included in the present disclosure.

Figure 2B:
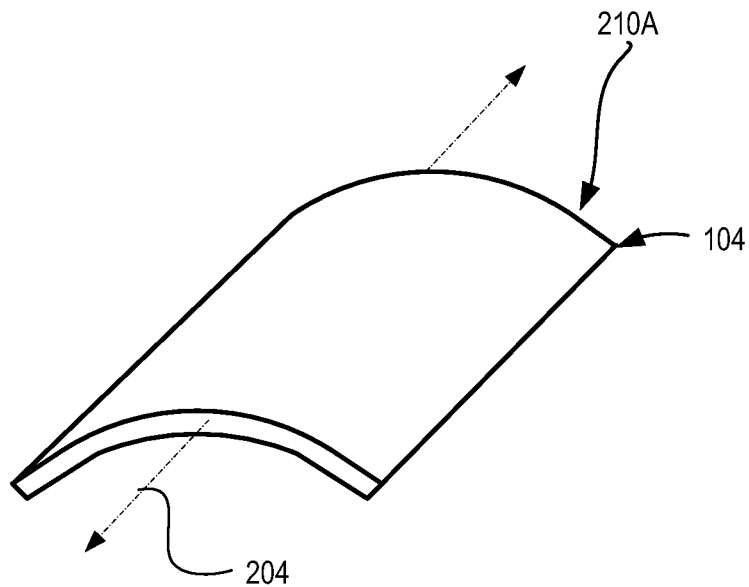
FIG. 2B illustrates the example shape-changing device housing of FIG. 2A in a second physical configuration in which the device housing curves about or along a longitudinal axis upon receipt of a notification, in accordance with at least one embodiment of the present disclosure.

FIG. 2B is a perspective view of the illustrative device housing 104 depicted in FIG. 2A in a second physical configuration 210A in which the device housing 104 has been curved about the first axis 204 or along the second axis 206, in accordance with at least one embodiment of the present disclosure. This second physical configuration 210A (i.e., curvature about the first axis 204) may be indicative of a first class or a first type of notification, for example a notification that an incoming call has been missed. In some instances, one or more additional notifications, such as an audible notification or a visual notification, may be provided in addition to the second physical configuration 210A depicted in FIG. 2B.

Figure 2C:
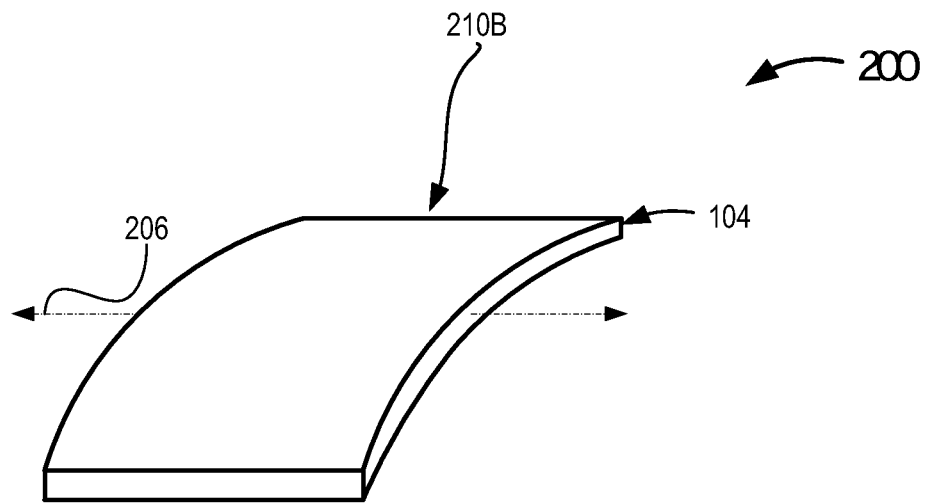
FIG. 2C illustrates the example shape-changing device housing of FIG. 2A in a second physical configuration in which the device housing curves about or along a lateral axis upon receipt of a notification, in accordance with at least one embodiment of the present disclosure.

FIG. 2C is a perspective view of the illustrative device housing 104 depicted in FIG. 2A in a second physical configuration 210B in which the device housing 104 has been curved about the second axis 206 or along the first axis 204, in accordance with at least one embodiment of the present disclosure. This second physical configuration 210B (i.e., curvature about the second axis 206) may be indicative of a second class or a second type of notification, for example notification that a new email or SMS message has been received by the device 100. In some instances, one or more other notifications, such as an audible notification or a visual notification, may be provided in addition to the second physical configuration 210B depicted in FIG. 2C.

In some instances, the physical configuration controller 124 may provide more than one notification, for example a second physical configuration, such as 210A, when an incoming telephone call has been missed and another second physical configuration, such as 201B, when the device 100 receives a new email or SMS message. In some instances, where such a multiple notification situation has arisen, the physical configuration controller 124 may alternately transition from the first physical configuration 202 to the second physical configuration 210A, back to the first physical configuration 202, and then to the second physical configuration 210B. Such an alternating sequence of physical configurations may be extended to cover any number of notifications, each having a unique second physical configuration. In other instances, where such a multiple notification situation has arisen, the physical configuration controller 124 may transition from the first physical configuration 202 to the second physical configuration 210, then to the second physical configuration 210B, and back to the first physical configuration 202. Such a sequence of physical configurations may be extended to cover any number of notifications, each having a unique second physical configuration.

Figure 2D:
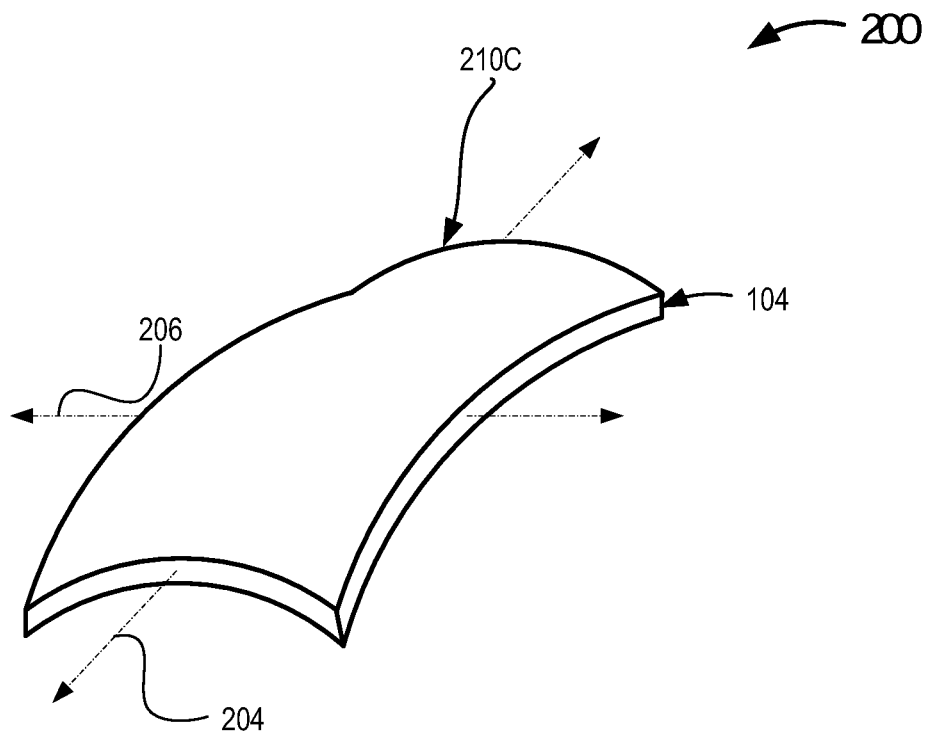
FIG. 2D illustrates the example shape-changing device housing of FIG. 2A in a second physical configuration in which the device housing curves about or along a longitudinal axis and curves about or along a lateral axis upon receipt of a notification, in accordance with at least one embodiment of the present disclosure.

FIG. 2D is a perspective view of the illustrative housing 104 depicted in FIG. 2A in a second physical configuration 210C that is a combination of the second physical configuration 210A depicted in FIG. 2B and the second physical configuration 210B depicted in FIG. 2C, in accordance with at least one embodiment of the present disclosure. In addition to presenting an alternating or sequential series of second physical configurations 210, in some instances, the physical configuration controller 124 may combine two or more second physical configurations 210 into a single second physical configuration, such as depicted in FIG. 2D.

In FIG. 2D, the device housing 104 has been curved into a combined second physical configuration 210C that includes a curvature about the first axis 204 or along the second axis 206 (210A as in FIG. 2B) and curvature about the second axis 206 or along the first axis 204 (210B as in FIG. 2C). Second physical configuration 210C is thus a combination of second physical configuration 210A and second physical configuration 210B. This second physical configuration 210D (i.e., curvature about the both exes 204 and 206) may be indicative of a combination of two notifications, a first notification (e.g., missed incoming call) and a second notification (e.g., new incoming email or SMS message). Although a combination of only two notifications is shown in FIG. 2D for clarity, any number of such second physical configurations may be so combined. In some instances, one or more additional notifications, such as an audible notification or a visual notification, may be provided in addition to the second physical configuration 210C depicted in FIG. 2D.

Figure 3:
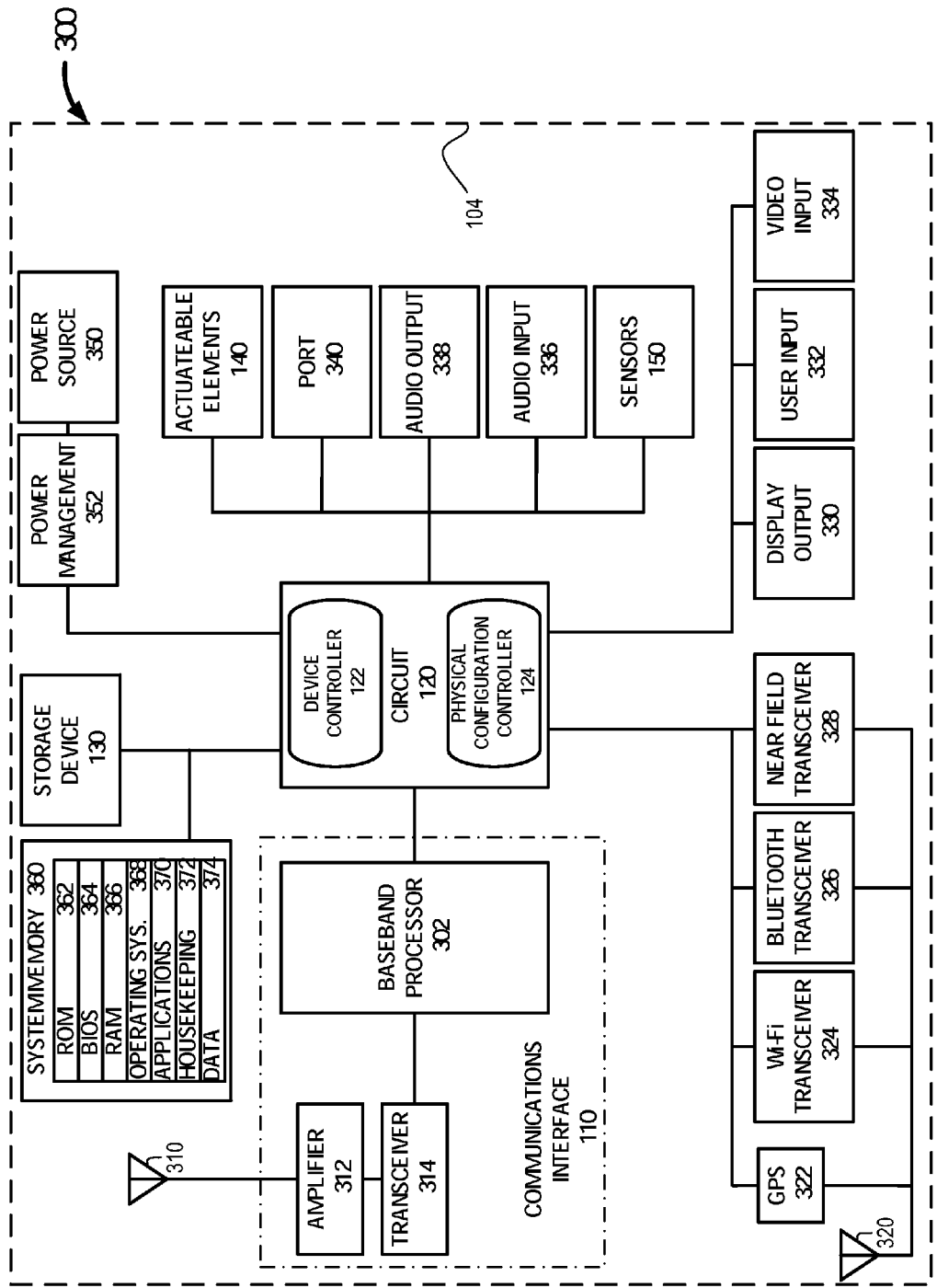
FIG. 3 illustrates a block diagram of an example physical configuration controller, in accordance with at least one embodiment of the present disclosure.

FIG. 3 is a block diagram of an illustrative portable electronic device 300, in accordance with at least one embodiment of the present disclosure. The electronic device 300 may include a cellular communication device such as a smartphone. A baseband processor 302 is communicably coupled to the circuit 120. In embodiments, the baseband processor 302 may control all or a portion of the GSM, CDMA, WiMAX, HSPA, or LTE cellular radio functions including, but not limited to, signal generation, transmission, reception, modulation, and encoding. In some embodiments the baseband processor 302 may control one or more aspects of frequency shifting of the cellular signals. The baseband processor 302 may include a single- or multiple processing cores. In embodiments, a multi-core baseband processor 302 may contemporaneously perform a variety of functions related to the transmission and reception of RF signals via a cellular network. For example, the baseband processor may contemporaneously perform any number of the following: parameter estimation, signal searching, signal transmission, and signal reception. In some implementations, the baseband processor 302 may search and track cellular signals and may perform cell selection.

For voice or other data, the baseband processor 302 may use one or more codecs that compress and decompress the data to fit within the cellular frame responsible for transporting the data across a cellular network. The baseband processor 302 may execute a real time operating system (RTOS) that is separate from an operating system executed by the circuit 120, for example by the device controller 122. The RTOS executed by the baseband processor may be stored in one or more storage devices (not shown in FIG. 3) disposed internal to the baseband processor 302. Although depicted as a separate device in FIG. 3, in some implementations, the circuit 120 may provide at least a portion of baseband processing functionality.

The electronic device 300 includes one or more cellular antennas 310. The one or more cellular antennas 310 may include, but are not limited to, one or more helix type antennas, one or more planar inverted F-type antennas, one or more whip antennas, one or more patch antennas, or combinations thereof. In at least some implementations, the one or more cellular antennas 310 may include a multi-band antenna, for example a cellular antenna 310 capable of receiving 806 MHz to 824 MHz and 851 MHz to 869 MHz CDMA frequency bands; 824 MHz to 849 MHz and 869 MHz to 894 MHz GSM/CDMA/3G frequency bands; and 1710 MHz to 1755 MHz and 2110 MHz to 2155 MHz 3G and 4G frequency bands.

The one or more cellular antennas 310 communicably couple to one or more amplifiers 312. The one or more amplifiers 312 may include filtering and amplification to improve the fidelity of the cellular signals provided to the cellular transceiver 314. In some implementations, the communications interface 110 may include some or all of the baseband processor 302, the amplifier 312, and the cellular transceiver 314.

In embodiments, the electronic device 300 may include one or more secondary antennas or antenna systems 320. Such secondary antenna systems 320 may provide access to one or more geolocation signals, one or more IEEE 802.11 compliant (Wi-Fi) signals, one or more BLUETOOTH® compliant signals, one or more near field communication (NFC) compliant signals, or combinations thereof. The secondary antenna system 320 may communicably couple to one or more geolocation transceivers 322, for example one or more Global Positioning System (GPS) transceivers or one or more Global Navigation Satellite System (GLONASS) transceivers. In embodiments, the secondary antenna system 320 may communicably couple to one or more IEEE 802.11 wireless transceivers 324, one or more BLUETOOTH® transceivers 326, one or more near field communication (NFC) transceivers 328, or combinations thereof.

The circuit 120 may execute one or more sets of machine-readable instructions that, when executed by the circuit 120, cause at least a portion of the circuit 120 to provide an applications processor. In some implementations, the circuit 120, via the applications processor, generates one or more display outputs 330, accepts one or more user inputs 332 (e.g., a hard keyboard or a soft keyboard displayed on a display device, a pointer or touchscreen input, or similar), accepts one or more video inputs 334 (e.g., a motion or still digital image acquisition device), accepts one or more audio inputs 336, generates one or more audio outputs 338, and supports communication with external devices via one or more wired or wireless ports or similar interfaces 340 (e.g., a microUSB or Lightning® port).

As discussed above with respect to FIG. 1, at least a portion of the circuit 120 may provide the physical configuration controller 124 that generates one or more output signals 142 for each of the actuateable elements 140. In some implementations, the physical configuration controller 124 may also receive any number of signals from the one or more sensors 150.

The circuit 120 may execute one or more sets of sets of machine-readable instructions that, when executed by the circuit 120, cause at least a portion of the circuit 120 to provide a device controller 122. In embodiments, all or a portion of the device controller 122 may be included in the applications controller. In other embodiments, all or a portion of the applications controller may be included in the device controller 122. The circuit 120 controls the flow and distribution of power from a power source 350, such as a secondary battery, to the various components included in the electronic device 300 via one or more power management systems 352.

The circuit 120 may include any number, type, or combination of devices. At times, the circuit 120 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art.

The system memory 360 may include read-only memory ("ROM") 362 and random access memory ("RAM") 366. A portion of the ROM 362 may contain a basic input/output system ("BIOS") 364 for the electronic device 300. The BIOS 364 may provide basic functionality to the physical configuration controller 124, for example by causing the circuit 120 to load the machine-readable instruction sets that cause the circuit 120 to provide and function as the physical configuration controller 124.

In some implementations, the system memory 360 may include one or more machine-readable instruction sets. Such machine-readable instruction sets may include, but are not limited to, an operating system 368, one or more application programs 370, housekeeping programs 372 and program data 374. In at least some implementations, the circuit 120 may load one or more machine-readable instruction sets from the storage device 130 into system memory 360 for execution. In various implementations, one or more of the machine-readable instruction sets stored or otherwise retained in the storage device 130 transforms at least a portion of the circuit 120 into the device controller 122, the physical configuration controller 124, or any combination thereof.

In some implementations, data stored or otherwise retained on the storage device 130 may include one or more data stores or databases containing data representative of a number of logical associations between an occurrence of a particular event and a particular second physical configuration. For example, the storage device 130 may contain data representative of the logical association between a second physical configuration that includes curvature about a longitudinal axis 204 and receipt of an incoming email by the electronic device 300. In operation, upon occurrence of various events (e.g., missed incoming telephone call, arrival of a new email, arrival of a new SMS message, receipt of a new voicemail, and similar, the device controller 122 may communicate one or more notifications or messages to the physical configuration controller. In embodiments, each notification or message may include data representative of the type of event. Upon receiving the notification, the physical configuration controller 124 may perform one or more operations to retrieve data representative of the corresponding second physical configuration from the storage device 130.

Upon retrieving the data indicative of the second physical configuration from the storage device 130, the physical configuration controller 124 selects the actuateable device(s) 140 and determines the appropriate displacement of each selected actuateable device 140 to achieve the indicated second physical configuration. The physical configuration controller 124 generates one or more output signals 142 that cause the selected actuateable device(s) 140 to achieve the appropriate displacement.

In embodiments, the device controller 122, the physical configuration controller 124 or a combination thereof, may receive signals 152 generated by one or more sensors 150. In embodiments, at least some of the signals 152 may include data representative of one or more environmental variables as the electronic device 300 transforms from the first physical configuration 202 to the second physical configuration 204. In one example, a signal indicative of the brightness of ambient light incident upon an image sensor 150 may be used by the physical configuration controller 124 to determine whether the electronic device 300 is in a "face down" or "face up" posture on a surface. Such information may then be used by the physical configuration controller 124 to determine the most appropriate direction of curvature for the second physical configuration 204.

In another example, a signal indicative of the resistance encountered during or the power/force required to achieve the transition from the first physical configuration 202 to the second physical configuration 204 may be provided by one or more sensors 150. The physical configuration controller 124 may compare such data with one or more defined resistance thresholds to determine whether the transition from the first physical configuration 202 to the second physical configuration 204 should be abandoned. Such increased resistance may occur, for example, if the electronic device 300 is positioned beneath a heavy object at the time the physical configuration controller 124 attempts to transition the housing 104 from the first physical configuration 202 to the second physical configuration 204. While shown in FIG. 3 as being stored in the system memory 360, the operating system 368, application programs 370, other programs/modules 372, and program data 374 may be stored in whole or in part on the storage device 130.

Figure 4:
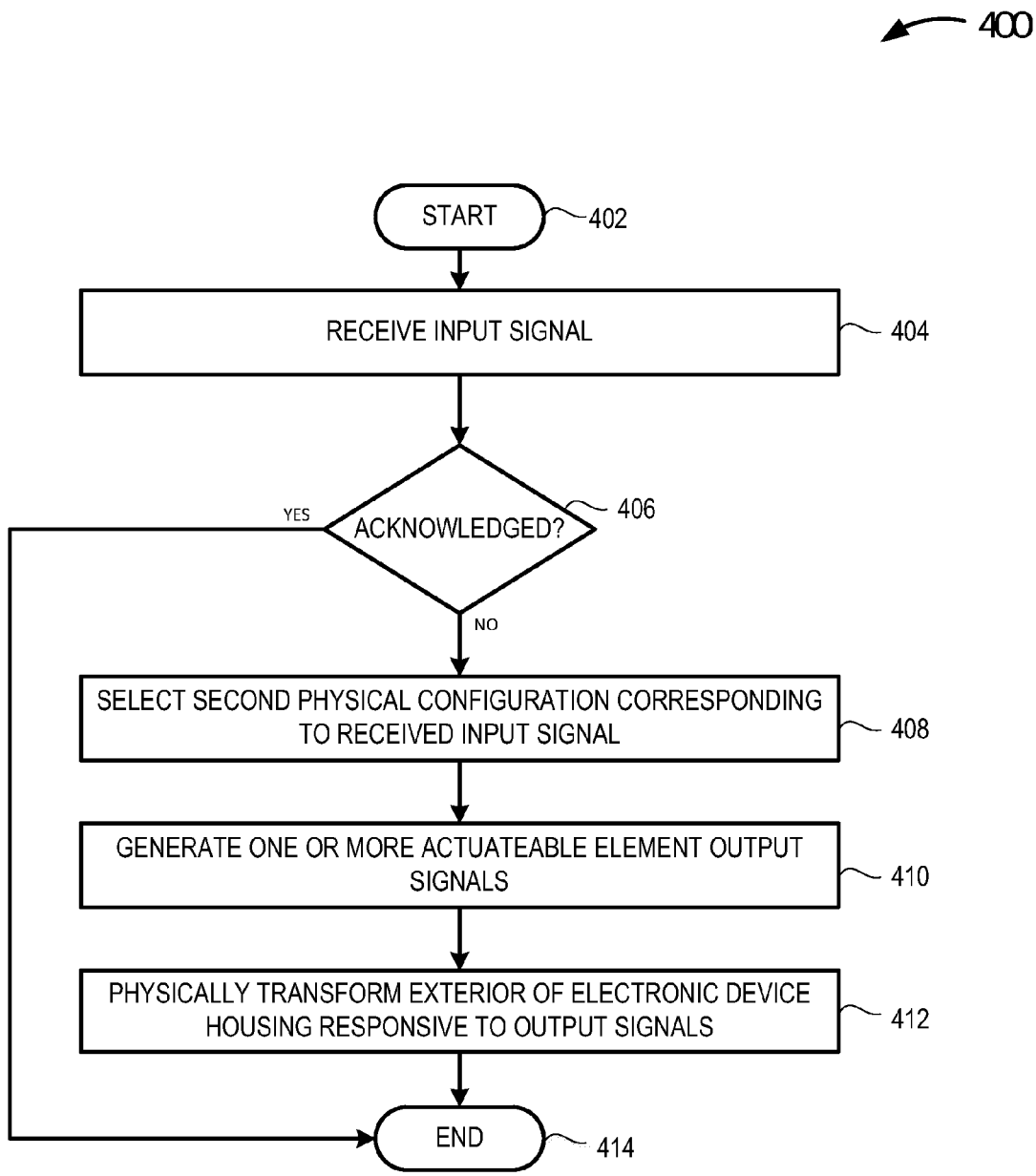
FIG. 4 illustrates a high-level flow diagram of an example method of causing an electronic device housing to transition from a first physical configuration to a second physical configuration responsive to one or more output signals from the physical configuration controller, in accordance with at least one embodiment of the present disclosure.

FIG. 4 is a high-level flow diagram of an illustrative method 400 of changing the shape of an electronic device housing 104 from a first physical configuration 202 to a second physical configuration 204, in accordance with at least one embodiment of the present disclosure. In some implementations the occurrence of one of more events causes the circuit 120 to generate one or more notifications or messages that are forwarded to the physical configuration controller 124. The notification includes data indicative of the event that occurred which caused the generation of the notification. The physical configuration controller 124 determines whether the event causing the notification is logically associated with a second physical configuration 204. Responsive to determining the event is logically associated with a second physical configuration 204, the physical configuration controller 124 selects the second physical configuration and generates one or more output signals 142 that selectively displace one or more actuateable elements 140 a defined distance to achieve the selected second physical configuration 204. The method 400 commences at 402.

At 404, an input signal is received by the circuit 120. In at least some implementations, the input signal is provided by a broadband processor 302 to the device controller 122. The input signal includes data indicative of an occurrence of one or more defined events. Such defined events can include any event or occurrence and may include, but are not limited to one or more of the following: an unacknowledged missed incoming telephone call, an unacknowledged new voice mail message, an unacknowledged new incoming email, an unacknowledged new incoming SMS message, an unacknowledged new push notification, an unacknowledged new Amber alert, or similar.

At 406, the device controller 122 or the physical configuration controller 124 determines whether the device user has acknowledged the event indicated by the input signal. If the device user acknowledges the event, for example by logging into the device, providing one or more defined inputs (e.g., pressing one or more defined input devices or buttons), or similar, the method 400 terminates at 414 and the physical configuration controller 124 does not attempt a transition from the first physical configuration 202 to the second physical configuration 204.

At 408, the physical configuration controller 124 selects the second physical configuration 204 corresponding to the received input signal. Responsive to the user's failure to provide an acknowledgement to the input signal at 406, the physical configuration controller 124 receives the notification or similar message from the device controller 122. The notification or message may contain or otherwise include data indicative of one or more characteristics or content of the input signal received by the device controller 122. The physical configuration controller 124 determines whether a logical association exists between the content of the input signal and a second physical configuration 204.

At 410, the physical configuration controller 124 determines which actuateable elements 140 will produce the desired second physical configuration selected at 408 and also determines the corresponding displacement for each of the selected actuateable elements 142. The physical configuration controller 124 generates an output signal 142 for each of the actuateable elements 140.

At 412, the actuateable elements 140 are displaced a distance sufficient to transition the electronic device housing 104 from the first physical configuration 202 to the second physical configuration 204. In some instances, some or all of the actuateable elements 140 may remain in the second physical configuration 204 after power is removed from the actuateable elements 140 (i.e., the actuateable elements are "fail in position" type elements). In some instances, some or all of the actuateable elements 140 may return to either the first physical configuration 202 after power is removed from the actuateable elements 140.

In some embodiments, the device controller 122 or the physical configuration controller 124 may delay the shape causing the actuateable elements 140 to change the shape the electronic device 100 for a defined period of time (e.g., 30 seconds, 60 seconds, 90 seconds, 120 seconds, or longer) to provide the user time to respond to the notification. In some embodiments, the device controller 122 or the physical configuration controller 124 may cause the actuateable elements 140 to change the shape the electronic device 100 immediately in response to a notification from one or more defined parties or in response to one or more defined urgent notifications and may delay the shape causing the actuateable elements 140 to change the shape the electronic device 100 for a defined period of time (e.g., 30 seconds, 60 seconds, 90 seconds, 120 seconds, or longer) in other instances.

In some instances, the device controller 122 or the physical configuration controller 124 may cause the actuateable elements 140 to change the shape the electronic device 100 based on one or more environmental parameters. For example, if one or more sensors indicate the user is using or is proximate the electronic device 100, the shape change may be delayed by a defined amount of time (e.g., 30 seconds, 60 seconds, 90 seconds, 120 seconds, or longer) or be delayed until the occurrence of a defined event (e.g., shape change delayed until user concludes a telephone call in progress when the notification is received by the physical configuration controller 124). In such instances, if one or more sensors indicate the user is away from the electronic device 100, the physical configuration controller 124 may cause the actuateable elements 140 to change the shape of the electronic device housing 104 immediately upon receipt of the notification. In such instances, if one or more sensors indicate the user is away from the electronic device 100, the physical configuration controller 124 may cause the actuateable elements 140 to change the shape of the electronic device housing 104 immediately upon occurrence of an event such as the user picking up the electronic device 100. The method concludes at 414.

Figure 5:
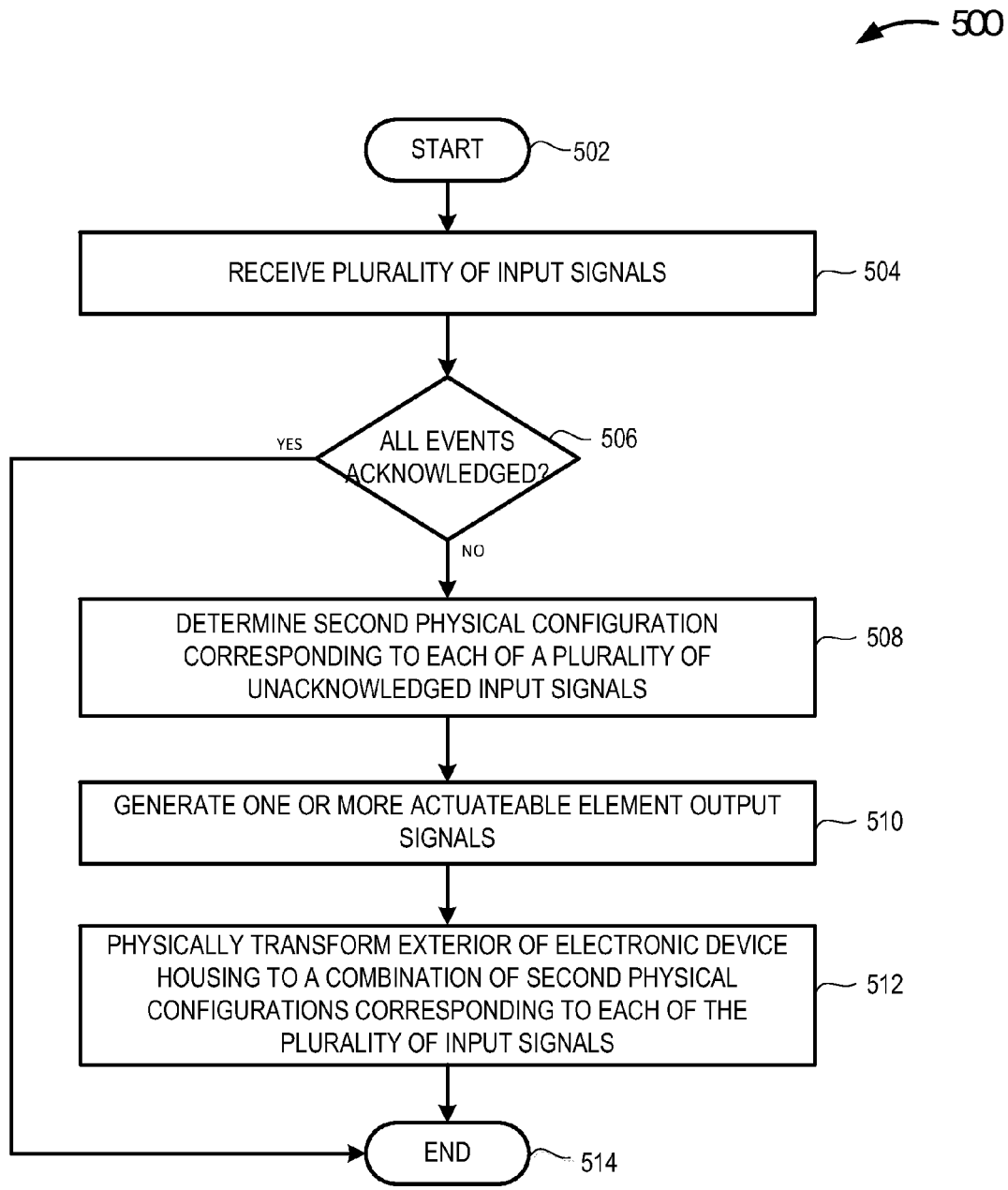
FIG. 5 illustrates a high-level flow diagram of an example method of causing an electronic device housing to transition from a first physical configuration to a combination of second physical configurations responsive to a plurality of output signals from a physical configuration controller, in accordance with at least one embodiment of the present disclosure.

FIG. 5 is a high-level flow diagram of an illustrative method 500 of changing the shape of an electronic device housing 104 from a first physical configuration 202 to a combination of second physical configurations 204, in accordance with at least one embodiment of the present disclosure. In some implementations the occurrence of a plurality of events causes the circuit 120 to generate a corresponding plurality of notifications or messages that are forwarded to the physical configuration controller 124. Each of the plurality of notifications includes data indicative of the event that occurred which caused the generation of the respective notification. For each of the notifications received from the device controller 122, the physical configuration controller 124 determines whether the event causing the respective notification is logically associated with a second physical configuration 204. Responsive to determining each of a plurality of the events are logically associated with one of a respective plurality of second physical configurations 204A-204n, the physical configuration controller 124 selects the plurality of second physical configurations 204A-204n and generates one or more output signals 142 that combine the plurality of second physical configurations 204A-204n and selectively displaces one or more actuateable elements 140 a defined distance to achieve the selected combined second physical configuration 204. The method 500 commences at 502.

At 504, a plurality of input signals are received by the circuit 120. In at least some implementations, the plurality of input signals are provided by a broadband processor 302 to the device controller 122. Each of the plurality of input signals includes data indicative of an occurrence of a defined event. Such defined events can include any event or occurrence and may include, but are not limited to one or more of the following: an unacknowledged missed incoming telephone call, an unacknowledged new voice mail message, an unacknowledged new incoming email, an unacknowledged new incoming SMS message, an unacknowledged new push notification, an unacknowledged new Amber alert, or similar.

At 506, the device controller 122 or the physical configuration controller 124 determines whether the device user has acknowledged all of the plurality of events indicated by the plurality of input signals. If the device user acknowledges all of the plurality of events, for example by logging into the device, providing one or more defined inputs (e.g., pressing one or more defined input devices or buttons), or similar, the method 500 terminates at 514 and the physical configuration controller 124 does not attempt a transition from the first physical configuration 202 to a combined second physical configuration 204.

At 508, the physical configuration controller 124 selects the second physical configurations 204A-204n corresponding to each of the unacknowledged input signals. Responsive to the user's failure to provide an acknowledgement to all of the plurality of input signals at 506, the physical configuration controller 124 receives notifications or similar messages for each of the unacknowledged input signals from the device controller 122. Each of the notifications or messages may contain or otherwise include data indicative of one or more characteristics or content of the respective input signal received by the device controller 122. The physical configuration controller 124 determines whether a logical association exists between the content of each of the input signals and a respective second physical configuration 204A-204n.

At 510, the physical configuration controller 124 combines all of the second physical configurations 204A-204n into a single combined second physical configuration and determines which actuateable elements 140 will produce the combined second physical configuration and also determines the corresponding displacement for each of the selected actuateable elements 142. The physical configuration controller 124 generates an output signal 142 for each of the actuateable elements 140.

At 512, the actuateable elements 140 are displaced a distance sufficient to transition the electronic device housing 104 from the first physical configuration 202 to the combined second physical configuration 204. In some instances, some or all of the actuateable elements 140 may remain in the combined second physical configuration 204 after power is removed from the actuateable elements 140 (i.e., the actuateable elements are "fail in position" type elements). In some instances, some or all of the actuateable elements 140 may return to either the first physical configuration 202 after power is removed from the actuateable elements 140. The method 500 concludes at 514.

Figure 6:
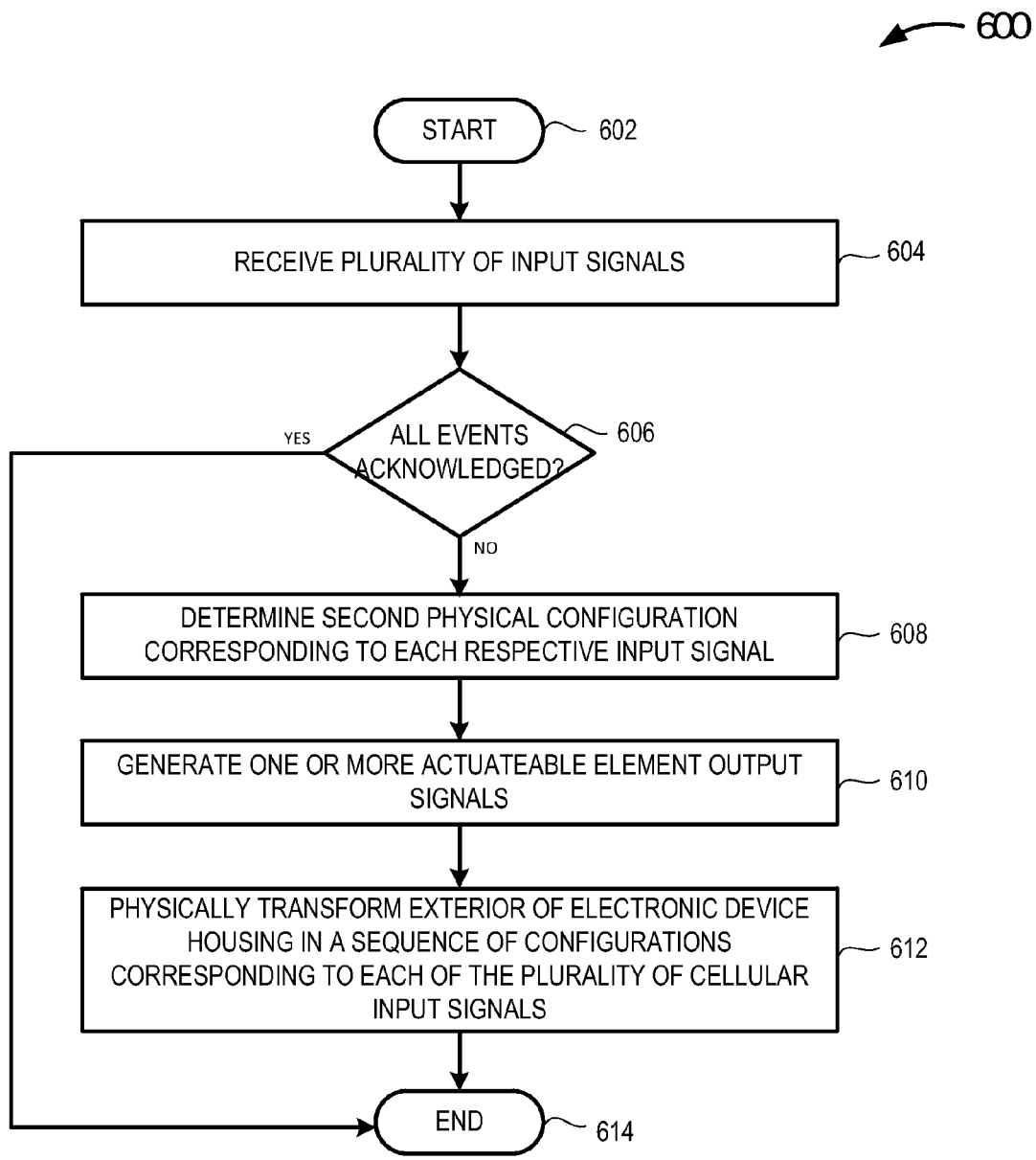
FIG. 6 illustrates a high-level flow diagram of an example method of causing an electronic device housing to transition through a sequence of second physical configurations responsive to a plurality of output signals from a physical configuration controller, in accordance with at least one embodiment of the present disclosure.

FIG. 6 is a high-level flow diagram of an illustrative method 600 of changing the shape of an electronic device housing 104 from a first physical configuration 202 to a sequence of second physical configurations 204, in accordance with at least one embodiment of the present disclosure. In some implementations the occurrence of a plurality of events causes the circuit 120 to generate a corresponding plurality of notifications or messages that are forwarded to the physical configuration controller 124. Each of the plurality of notifications includes data indicative of the event that occurred which caused the generation of the respective notification. For each of the notifications received from the device controller 122, the physical configuration controller 124 determines whether a second physical configuration 204 is logically associated with a particular event occurrence responsible for causing the generation of the respective notification. Responsive to determining that a particular second physical configuration 204 is logically associated with each of some or all of the plurality of the events, the physical configuration controller 124 selects a sequence that includes a plurality of second physical configurations 204A-204n and generates one or more output signals 142 that selectively, sequentially, displaces one or more actuateable elements 140 a defined distance to achieve the selected sequence of second physical configurations 204A-204n. The method 600 commences at 602.

At 604, a plurality of input signals are received by the circuit 120. In at least some implementations, a broadband processor 302 may provide the plurality of input signals to the device controller 122. Each of the plurality of input signals may include data indicative of an occurrence (e.g., newly received email) or a lack of an occurrence (e.g., failure to answer an incoming cellular telephone call) of a defined event. Such defined events can include one or more events or occurrences and may include, but are not limited to one or more of the following: an unacknowledged missed incoming telephone call, an unacknowledged new voice mail message, an unacknowledged new incoming email, an unacknowledged new incoming SMS message, an unacknowledged new push notification, an unacknowledged new Amber alert, or similar.

At 606, the device controller 122 or the physical configuration controller 124 determines whether a user has acknowledged each of the plurality of events indicated by the plurality of input signals. A user acknowledgement may include, but is not limited to, performing one or more actions or providing one or more inputs indicative of a user's receipt of the notification. If the device user acknowledges all of the plurality of events, for example by logging into the device, providing one or more defined inputs (e.g., providing one or more defined input sequences), or similar, the method 600 terminates at 614 and the physical configuration controller 124 does not attempt to transform the device housing 104 from the first physical configuration 202 to a second physical configuration 204.

At 608, the physical configuration controller 124 selects the respective second physical configuration 204A-204n corresponding to each of the unacknowledged events. Responsive to the user's failure to provide an acknowledgement to each of the plurality of input signals at 606, the physical configuration controller 124 receives from the device controller 122 notifications for each of the unacknowledged input signals. Each of the notifications may include data indicative of one or more characteristics or content of the respective input signal received by the device controller 122. In some instances, the characteristics may include, but are not limited to, one or more of the following: a time of the event occurrence, a location of the event occurrence, or the type of event occurrence. The physical configuration controller 124 determines whether a logical association exists between the event occurrence as indicated by the content of each of the input signals and a respective second physical configuration 204A-204n.

At 610, the physical configuration controller 124 generates a sequence of second physical configurations 204A-204n and determines the order in which actuateable elements 140 will produce the sequence of selected second physical configurations 204A-204n. The physical configuration controller 124 and also determines the corresponding displacement for each of the actuateable elements 140A-140n to reproduce the sequence of selected second physical configurations 204A-204n. The physical configuration controller 124 generates a sequence of output signals 142 for each of the actuateable elements 140 that corresponds to the sequence of second physical configurations 204A-204n.

At 612, the actuateable elements 140 are displaced a distance sufficient to transition the electronic device housing 104 from the first physical configuration 202 to each of the second physical configurations 204 included in the sequence of second physical configurations 204A-204n. The method 600 concludes at 614.

Figure 7:
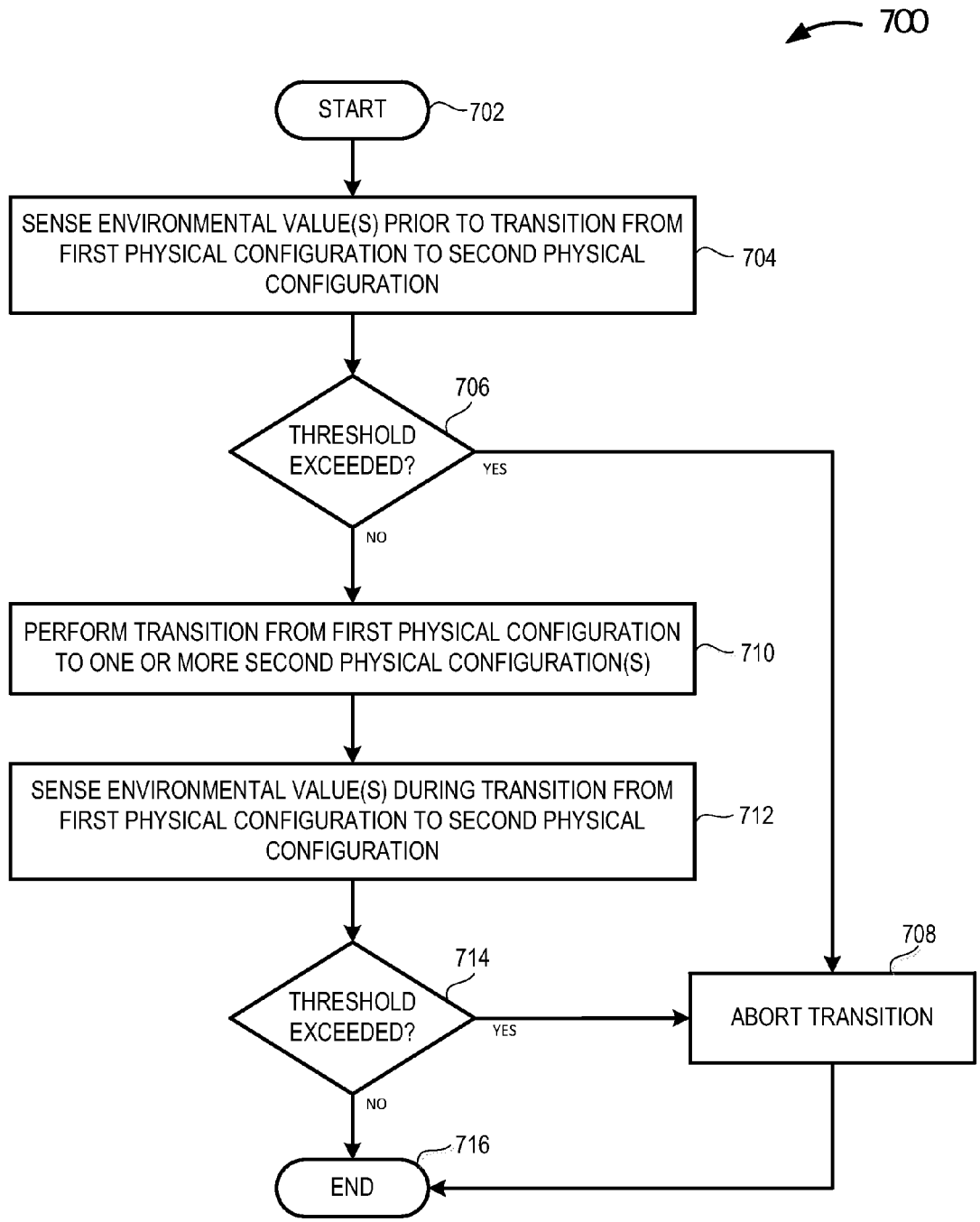
FIG. 7 illustrates a high-level flow diagram of an example method of aborting a transition from a first physical configuration to a second physical configuration, in accordance with at least one embodiment of the present disclosure.

FIG. 7 is a high-level flow diagram of an illustrative method 700 of aborting the transition from the first physical configuration 202 to the second physical configuration 204 if one or more sensed parameters exceed defined threshold values, in accordance with at least one embodiment of the present disclosure. In some implementations, the electronic device 100 may include any number of environmental sensors 150. Example environmental sensors 150 may include, but are not limited to, one or more brightness sensors, one or more accelerometers, one or more stress sensors, one or more strain sensors, one or more temperature sensors, one or more humidity or moisture sensors, one or more timekeepers, one or more motion sensors, or combinations thereof. Such environmental sensors 150 may be used by the physical configuration controller 124 to determine whether a transition from the first physical configuration 202 to the second physical configuration 204 should be performed. Such environmental sensors 150 may cause a transition from the first physical configuration 202 to the second physical configuration 204 should be aborted when in progress. Such environmental sensors 150 may cause the physical configuration controller 124 to schedule a transition from the first physical configuration 202 to the second physical configuration 204 at a time when the user is proximate or even holding the electronic device 100. The method 700 commences at 702.

At 704, the physical configuration controller 124 determines one or more environmental values prior to transitioning the device housing 104 from the first physical configuration 202 to the second physical configuration 204. In embodiments, the pre-transition environmental values may include, but are not limited to, the brightness sensed by one or more sensors 150, the time sensed by one or more sensors 150, or the motion sensed by one or more sensors 150. In some embodiments, the sensed environmental brightness may be used, for example, to determine whether the electronic device 100 is positioned face up or face down. Such information may be used by the physical configuration controller 124 to determine an angle of curvature such that a curvature up (i.e., concave when viewed from above) is indicative of a first event occurrence and curvature down (i.e., convex when viewed from above) is indicative of a second event occurrence. In some embodiments, the sensed environmental time (i.e., clock time) may be used by the physical configuration controller 124 to schedule a shape transition during a time period or interval when the user is active (e.g., schedule a shape change during morning hours when an event occurs during hours normally associated with a sleeping period).

At 706, the physical configuration controller 124 compares the pre-transition sensed environmental value against one or more threshold values to determine whether the transition from the first physical configuration 202 to the second physical configuration 204 should be performed. For example, the physical configuration controller 124 may assess whether a transition should be performed in a high ambient humidity environment when such a transition from the first physical configuration 202 to the second physical configuration 204 may increase the susceptibility of the electronic device to damage from such high humidity. If the sensed environmental or ambient condition exceeds one or more defined thresholds, the physical configuration controller 124 aborts the transition at 708 and the method 700 concludes at 716.

At 710, the physical configuration controller 124 commences the transition from the first physical configuration 202 to one or more second physical configurations 204.

At 712, the physical configuration controller 124 senses one or more environmental values during the transition from the first physical configuration 202 to the second physical configuration 204. In some embodiments, such environmental values may include the stress or strain exerted by the device housing 104 in performing the transition from the first physical configuration 202 to the second physical configuration 204. Such stress or strain is indicative of the force exerted by the actuateable elements 140 in performing the transition from the first physical configuration 202 to the second physical configuration 204. Such force exerted by the actuateable elements 140 may be measured indirectly, for example by measuring the current supplied to some or all of the actuateable elements 140.

At 714, the physical configuration controller 124 determines whether one or more environmental or ambient conditions exceeds one or more defined thresholds. For example, the force exerted by the actuateable elements 140 exceeds a defined threshold value. If the physical configuration controller 124 determines one or more environmental or ambient conditions exceeds one or more defined thresholds, the physical configuration controller 124 aborts the transition at 708 and the method 700 concludes at 716. At the successful conclusion of the transition from the first physical configuration 202 to the second physical configuration 204, the method concludes at 716.

Figure 8:
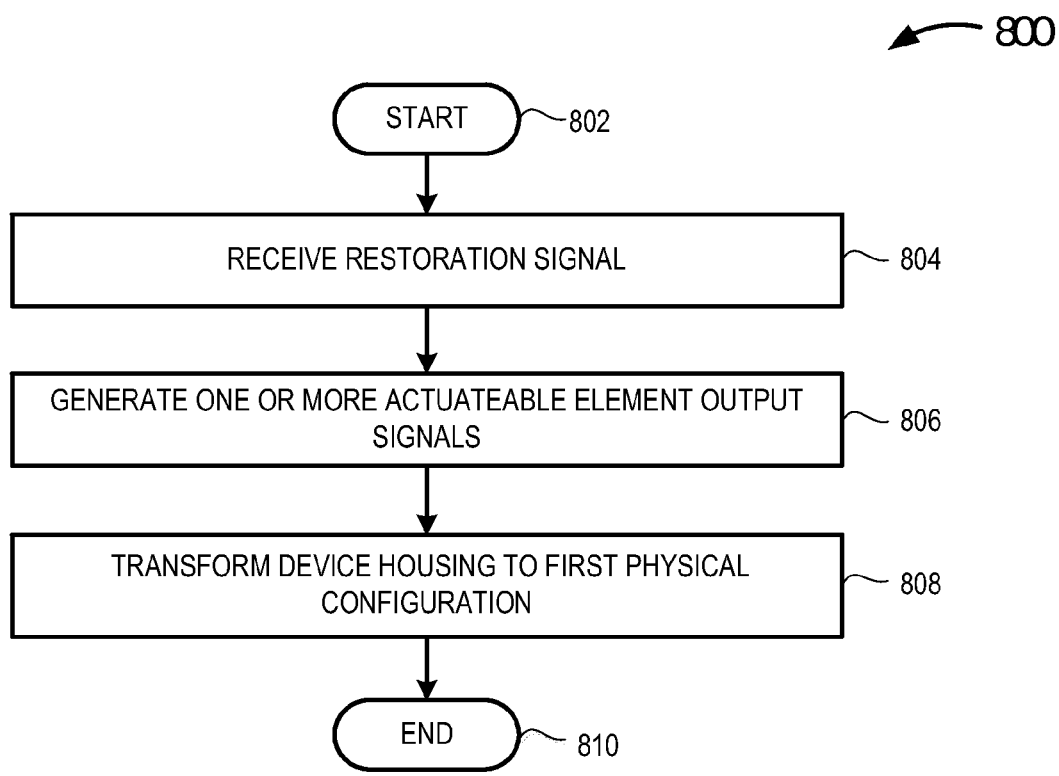
FIG. 8 illustrates a high-level flow diagram of an example method of causing an electronic device housing to transition back to a first physical configuration, in accordance with at least one embodiment of the present disclosure.

FIG. 8 is a high-level flow diagram of an illustrative method 800 of restoring the electronic device housing 104 to the first physical configuration 202 from the second physical configuration 204, in accordance with at least one embodiment of the present disclosure. In some instances, the device housing 104 may remain in the second physical configuration 204 until the occurrence is acknowledged by the device user. In some implementations, upon receiving a user acknowledgement, the device controller 122 may generate a restoration signal that is communicated to the physical configuration controller 124. In some implementations, upon receiving a user acknowledgement, the physical configuration controller 124 may self-generate a restoration signal. Upon receipt of the restoration signal, the physical configuration controller 124 transitions the device housing 104 to the first physical configuration 202. The method 800 commences at 802.

At 804, the physical configuration controller 124 receives or self-generates a restoration signal. In some instances, the restoration signal may be generated in response to a user taking a defined action that indicates an acknowledgement of the notification provided by the transition from the first physical configuration 202 to the second physical configuration 204. For example, a restoration signal may be generated when a user views a previously unviewed email that resulted in the generation of a notification and consequent transition of the device housing 104 from the first physical configuration 202 to the second physical configuration 204. In some instances, a restoration signal may be generated when a user performs a defined action, for example pressing an acknowledgement button or other device on the device housing 104. In some instances, a restoration signal may be generated by manual application of a restoring force to the device housing 104 (e.g., a force indicative of "bending back" the device housing to the first physical configuration).

At 806, the physical configuration controller 124 determines the displacement for each of the actuateable elements 140 to restore the device housing 104 to the first physical configuration 202. After determining the displacement for each of the actuateable elements 140, the physical configuration controller 124 generates a sequence of output signals 142 for each of the actuateable elements 140.

At 808, the actuateable elements 140 are displaced a distance sufficient to transition the electronic device housing 104 to the first physical configuration 202. The method 800 concludes at 810.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binding a trusted input session to a trusted output session to prevent the reuse of encrypted data obtained from prior trusted output sessions.

According to example 1 there is provided an electronic garbage collection system for improving memory usage and access. The electronic garbage collection system may include an atomic transactional memory to provide data storage for objects accessible by a number of mutators. The system may include a circuit communicably coupled to the atomic transactional memory. The system may further include a storage device coupled to the circuit and containing a first machine-readable instruction set that, when executed, cause the circuit to operate as a garbage collection circuit, the garbage collection circuit to: attempt a first number of transactional fast path moves of an object from a first memory location in the transactional memory to a second memory location in the transactional memory; and attempt a non-transactional slow-path move of the object from the first memory location to the second memory location responsive to failing to move the object after attempting the first number of transactional fast-path moves.

Example 2 may include elements of example 1 where the storage device includes a second machine-readable instruction set that may cause at least one mutator to read data representative of an address corresponding to the second memory location from a forwarding field logically associated with the first memory location. The second machine-readable instruction set may further cause the at least one mutator to determine, at a first time, the content of a forwarding field logically associated with the second memory location and update the object in the second memory location responsive to the presence of data indicative of at least one of: no logic state, a first logic state, or a second logic state in the forwarding field logically associated with the second memory location.

According to example 1, there is provided a physically transformable housing for an electronic device. The physically transformable housing may include a housing including an exterior surface having a first physical configuration that facilitates a use of the electronic device by a user. The physically transformable housing may include a number of actuateable elements operably coupled to at least a portion of the exterior surface of the housing. The physically transformable housing may include a circuit disposed in the housing, the circuit communicably coupled to each of the number of actuateable elements and a storage device communicably coupled to the circuit, the storage device including at least one of data or machine-readable instructions that, when executed by the circuit cause the circuit to provide a physical configuration controller. The physical configuration controller may receive a notification that includes data indicative of an event, the notification in response to a failure to receive, at the electronic device, an input acknowledging an occurrence of the event, determine a second physical configuration of the housing logically associated with the event, and generate an output for at least one of the number of actuateable elements, the output to cause the displacement of the at least one actuateable element and transition the housing from the first physical configuration to the second physical configuration.

Example 2 may include elements of example 1 and may additionally include at least one device controller communicably coupled to the physical configuration controller, the device controller to generate the notification responsive to a failure to receive, at the electronic device, the user input acknowledging the occurrence of the event.

Example 3 may include elements of example 2 where the event includes least one of: an incoming telephone call received by the electronic device; an unopened voicemail message received by the electronic device; a missed telephone call received by the electronic device; an SMS message received by the electronic device; or a receipt of an email message by the electronic device.

Example 4 may include elements of example 1 where the machine-readable instructions that cause the physical configuration controller to generate an output for at least one of the number of actuateable elements, may further cause the physical configuration controller to select at least one of the actuateable elements to transition the device housing from the first physical configuration to the second physical configuration and determine a displacement for each of the selected actuateable elements, the displacement sufficient to transition the device housing from the first physical configuration to the second physical configuration.

Example 5 may include elements of any of examples 1 through 4 where each of the number of actuateable elements may comprise at least one of: a linearly displaceable actuateable element; a shape memory alloy actuateable element; a piezo actuateable element, or a motorized actuateable element.

Example 6 may include elements of any of examples 1 through 4 where the machine-readable instructions may further cause the physical configuration controller to return the housing to the first physical configuration responsive to the receipt of a restoration signal.

According to example 7, there is provided a physical configuration controller to transition a housing for a portable electronic device from a first physical configuration to a second physical configuration. The physical configuration controller may include a circuit; and a communicably coupled storage device, the storage device including at least one of data or machine-readable instructions that, when executed by the circuit cause the circuit to provide a physical configuration controller. The physical configuration controller may receive a notification that includes data indicative of an event, the notification in response to a failure to receive, at the electronic device, an input acknowledging an occurrence of the event, determine a second physical configuration of the housing logically associated with the event, and generate an output for at least one of a number of actuateable elements, the output to cause the displacement of the at least one actuateable element and transition the housing from the first physical configuration to the second physical configuration.

Example 8 may include elements of example 7 where the event includes least one of: an incoming telephone call received by the electronic device; an unopened voicemail message received by the electronic device; a missed telephone call received by the electronic device; an SMS message received by the electronic device; or a receipt of an email message by the electronic device.

Example 9 may include elements of example 7 where the machine-readable instructions that cause the physical configuration controller to generate an output for at least one of a number of actuateable elements, may further cause the physical configuration controller to select at least one of the actuateable elements to transition the device housing from the first physical configuration to the second physical configuration and determine a displacement for each of the selected actuateable elements, the displacement sufficient to transition the device housing from the first physical configuration to the second physical configuration.

Example 10 may include elements of any of examples 7 through 9 where the machine-readable instructions may further cause the physical configuration controller to return the portable cellular communications device to the first physical configuration responsive to the receipt of a restoration signal.

According to example 11, there is provided a method of transitioning a housing for an electronic device from a first physical configuration to a second physical configuration. The method may include executing, by a circuit, a set of machine-readable instructions stored on a communicably coupled storage device, the machine-readable instructions, when executed, causing the circuit to provide at least a physical configuration controller. The method may further include receiving, by a physical configuration controller, a notification that includes data indicative of an event, the notification in response to a failure to receive, at the electronic device, an input acknowledging an occurrence of the event. The method may further include determining, by the physical configuration controller, a second physical configuration of the housing logically associated with the event and generating, by the physical configuration controller, an output for at least one of the number of actuateable elements.

Example 12 may include elements of example 11 and may additionally include displacing at least one actuateable element to transition the housing from the first physical configuration to the second physical configuration.

Example 13 may include elements of example 11 and may additionally include generating, by a communicably coupled device controller, the notification responsive to a failure to receive, at the electronic device, the user input acknowledging the occurrence of the event.

Example 14 may include elements of example 11 where receiving a notification that includes data indicative of an event includes receiving, by the physical configuration controller, a notification that includes data indicative of an event including least one of: an incoming telephone call received by the electronic device; an unopened voicemail message received by the electronic device; a missed telephone call received by the electronic device; an SMS message received by the electronic device; or a receipt of an email message by the electronic device.

Example 15 may include elements of example 11 where generating an output for at least one of the number of actuateable elements may include selecting, by the physical configuration controller, at least one of the actuateable elements to transition the device housing from the first physical configuration to the second physical configuration and determining, by the physical configuration controller, a displacement for each of the selected actuateable elements, the displacement sufficient to transition the device housing from the first physical configuration to the second physical configuration.

Example 16 may include elements of any of examples 11 through 15 where generating an output for at least one of the number of actuateable elements may include generating, by the physical configuration controller, an output for at least one of the number of actuateable elements each of the number of actuateable elements including at least one of: a linearly displaceable actuateable element; a shape memory alloy actuateable element; a piezo actuateable element, or a motorized actuateable element.

Example 17 may include elements of any of examples 11 through 15 and may additionally include receiving, by the physical configuration controller, one or more restoration signals and transitioning, by the physical configuration controller, the housing from the second physical configuration to the first physical configuration responsive to the receipt of the one or more restoration signals.

Example 18 may include elements of any of examples 11 through 15 where receiving a notification that includes data indicative of an event may include receiving, by the physical configuration controller, a plurality of notifications, each of the plurality of notifications including data indicative of a respective event, each of the plurality of notifications in response to a failure to receive, at the electronic device, an input acknowledging an occurrence of the respective event.

Example 19 may include elements of example 18 where generating an output for at least one of the number of actuateable elements may include generating a composite output for at least one of the number of actuateable elements, the composite output to transition the housing from the first physical configuration to a second physical configuration that is a composite of each of the second physical configurations logically associated with each respective one of the plurality of notifications.

Example 20 may include elements of example 18 where generating an output for at least one of the number of actuateable elements may include sequentially generating an output for at least one of the number of actuateable elements, sequentially generated output to transition the housing from the first physical configuration through a sequence of second physical configurations logically associated with each respective one of the plurality of notifications.

According to example 21, there is provided a physically convertible portable cellular communication device. The physically convertible portable cellular device may include a housing having an external surface, a transceiver to receive at least one of a number of signals, the transceiver at least partially disposed in the housing, and an actuateable element to reversibly physically configure all or a portion of the external surface of the housing from a first physical configuration to a second physical configuration responsive to the receipt of the at least one signal by the transceiver, the second physical configuration logically associated with the at least one received signal.

Example 22 may include elements of example 21 where the actuateable element may include at least one of: a linearly displaceable actuateable element; an actuateable element formed at least in part using shape memory alloy; a piezo actuateable element, or a motorized actuateable element.

Example 23 may include elements of example 21 where the number of signals include at least one of: a signal indicative of incoming cellular telephone call; a signal indicative of a new voicemail; a signal indicative of a missed cellular telephone call; a signal indicative of a new incoming SMS message; or a signal indicative of a new incoming email message.

According to example 24, there is provided a method of transitioning the physical shape of a housing disposed about an electronic device from a first physical configuration to at least one of a number of second physical configurations. The method may include receiving, by a physical configuration controller, one or more notifications. The method may additionally include selecting, by the physical configuration controller, one of the number of second physical configurations, each selected second physical configuration logically associated with a respective one of the one or more received notifications. The method may further include transitioning, by the physical configuration controller, at least a portion of an external surface of the electronic device housing to the selected second physical configuration.

Example 25 may include elements of example 24 and may additionally include receiving, by the physical configuration controller, at least one restoration signal and transitioning, by the physical configuration controller, the housing to the first physical configuration.

Example 26 may include elements of example 24 where transitioning at least a portion of an external surface of the electronic device housing to the selected second physical configuration may include displacing one or more actuateable elements operably coupled to at least a portion of the exterior surface of the housing to transition the housing from the first physical configuration to the second physical configuration.

Example 27 may include elements of example 26 where displacing one or more actuateable elements may include displacing at least one of: a linearly displaceable actuateable element; an actuateable element formed at least in part using shape memory alloy; a piezo actuateable element, or a motorized actuateable element.

Example 28 may include elements of example 24 where receiving one or more notifications may include receiving one or more notifications including at least one of: a notification indicative of an incoming cellular telephone call; a notification indicative of a new voicemail; a notification indicative of a missed cellular telephone call; a notification indicative of a new incoming SMS message; or a notification indicative of a new incoming email message.

According to example 29, there is provided a system for transitioning a housing for an electronic device from a first physical configuration to a second physical configuration. The system for transitioning a housing for an electronic device from a first physical configuration to a second physical configuration may include a means for receiving a number of notifications, each of the notifications including data indicative of a respective event, each of the number of notifications in response to a failure to receive, at the electronic device, an input acknowledging an occurrence of the respective event. The system for transitioning a housing for an electronic device from a first physical configuration to a second physical configuration may further include a means for determining a second physical configuration logically associated with the notification and a means for generating an output for at least one of the number of actuateable elements to transition an exterior surface of the housing from the first physical configuration to the second physical configuration.

Example 30 may include elements of example 29 and may additionally include a means for displacing at least a portion of an external surface of the housing to transition the housing from the first physical configuration to the second physical configuration.

Example 31 may include elements of example 29 and may additionally include a means for generating each of the number of notifications in response to a failure to receive, at the electronic device, the input acknowledging the occurrence of the respective event.

Example 32 may include elements of example 29 where receiving a notification that includes data indicative of an event includes receiving, by the physical configuration controller, a notification that includes data indicative of an event including least one of: an incoming telephone call received by the electronic device; an unopened voicemail message received by the electronic device; a missed telephone call received by the electronic device; an SMS message received by the electronic device; or a receipt of an email message by the electronic device.

Example 33 may include elements of example 29 where the means for generating an output for at least one of the number of actuateable elements to transition an exterior surface of the housing from the first physical configuration to the second physical configuration may include a means for selecting at least one of the actuateable elements to transition the device housing from the first physical configuration to the second physical configuration and a means for determining a displacement for each of the selected actuateable elements, the displacement sufficient to transition the housing from the first physical configuration to the second physical configuration.

Example 34 may include elements of any of examples 29 through 33 where the means for generating an output for at least one of the number of actuateable elements may include a means for generating an output for at least one of the number of actuateable elements each of the number of actuateable elements including at least one of: a linearly displaceable actuateable element; a shape memory alloy actuateable element; a piezo actuateable element, or a motorized actuateable element.

Example 35 may include elements of any of examples 29 through 33 and may additionally include a means for receiving one or more restoration signals and a means for transitioning the housing from the second physical configuration to the first physical configuration responsive to the receipt of the one or more restoration signals.

Example 36 may include elements of any of examples 29 through 33 where the means for receiving a number of notifications, each of the notifications including data indicative of a respective event may include a means for receiving a plurality of notifications, each of the plurality of notifications including data indicative of a respective event.

Example 37 may include elements of example 36 where the means for generating an output for at least one of the number of actuateable elements may include a means for generating a composite output for at least one of the number of actuateable elements, the composite output to transition the housing from the first physical configuration to a second physical configuration that is a composite of each of the second physical configurations logically associated with each respective one of the plurality of notifications.

Example 38 may include elements of example 36 where the means for generating an output for at least one of the number of actuateable elements may include a means for sequentially generating an output for at least one of the number of actuateable elements, sequentially generated output to transition the housing from the first physical configuration through a sequence of second physical configurations logically associated with each respective one of the plurality of notifications.

According to example 39, there is provided a system for transitioning an electronic device housing from a first physical configuration to a second physical configuration, the system being arranged to perform the method of any of the claims 11 to 20.

According to example 40, there is provided a chipset arranged to perform the method of any of the claims 11 to 20.

According to example 41, there is provided at least one machine-readable medium comprising a plurality of instructions that, in response to be being executed on a computing device, cause the computing device to carry out the method according to any of the claims 11 to 20.

According to example 42, there is provided a device configured for transitioning an electronic device housing from a first physical configuration to a second physical configuration, the device being arranged to perform the method of any of the claims 11 to 20.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A physically transformable housing for an electronic device, comprising:
    a housing including an exterior surface having a first physical configuration that facilitates a use of the electronic device by a user;
    a number of actuateable elements operably coupled to at least a portion of the exterior surface of the housing;
    a circuit disposed in the housing, the circuit communicably coupled to each of the number of actuateable elements; and
    a storage device communicably coupled to the circuit, the storage device including at least one of data or machine-readable instructions that, when executed by the circuit cause the circuit to provide a physical configuration controller, the physical configuration controller to:
        receive a notification that includes data indicative of an event, the notification in response to a failure to receive, at the electronic device, an input acknowledging an occurrence of the event;
        determine a second physical configuration of the housing logically associated with the event; and
        generate an output for at least one of the number of actuateable elements, the output to cause the displacement of the at least one actuateable element and transition the housing from the first physical configuration to the second physical configuration.

2. The device of claim 1, further comprising:
    at least one device controller communicably coupled to the physical configuration controller, the device controller to generate the notification responsive to a failure to receive, at the electronic device, the user input acknowledging the occurrence of the event.

3. The device of claim 2 wherein the event includes least one of: an incoming telephone call received by the electronic device; an unopened voicemail message received by the electronic device; a missed telephone call received by the electronic device; an SMS message received by the electronic device; or a receipt of an email message by the electronic device.

4. The device of claim 1 wherein the machine-readable instructions that cause the physical configuration controller to generate an output for at least one of the number of actuateable elements, further cause the physical configuration controller to:
    select at least one of the actuateable elements to transition the device housing from the first physical configuration to the second physical configuration; and
    determine a displacement for each of the selected actuateable elements, the displacement sufficient to transition the device housing from the first physical configuration to the second physical configuration.

5. The device of claim 1 wherein each of the number of actuateable elements comprises at least one of: a linearly displaceable actuateable element; a shape memory alloy actuateable element; a piezo actuateable element, or a motorized actuateable element.

6. The device of claim 1 wherein the machine-readable instructions further cause the physical configuration controller to:
   return the housing to the first physical configuration responsive to the receipt of a restoration signal.

7. A physical configuration controller to transition a housing for a portable electronic device from a first physical configuration to a second physical configuration, the physical configuration controller comprising:
   a circuit; and
   a communicably coupled storage device, the storage device including at least one of data or machine-readable instructions that, when executed by the circuit cause the circuit to provide a physical configuration controller, the physical configuration controller to:
      receive a notification that includes data indicative of an event, the notification in response to a failure to receive, at the electronic device, an input acknowledging an occurrence of the event;
      determine a second physical configuration of the housing logically associated with the event; and
      generate an output for at least one of a number of actuateable elements, the output to cause the displacement of the at least one actuateable element and transition the housing from the first physical configuration to the second physical configuration.

8. The controller of claim 7 wherein the event includes least one of: an incoming telephone call received by the electronic device; an unopened voicemail message received by the electronic device; a missed telephone call received by the electronic device; an SMS message received by the electronic device; or a receipt of an email message by the electronic device.

9. The controller of claim 7 wherein the machine-readable instructions that cause the physical configuration controller to generate an output for at least one of a number of actuateable elements, further cause the physical configuration controller to:
   select at least one of the actuateable elements to transition the device housing from the first physical configuration to the second physical configuration; and
   determine a displacement for each of the selected actuateable elements, the displacement sufficient to transition the device housing from the first physical configuration to the second physical configuration.

10. The controller of claim 7 wherein the machine-readable instructions further cause the physical configuration controller to:
    return the portable cellular communications device to the first physical configuration responsive to the receipt of a restoration signal.

11. A method of transitioning a housing for an electronic device from a first physical configuration to a second physical configuration, comprising:
    executing, by a circuit, a set of machine-readable instructions stored on a communicably coupled storage device, the machine-readable instructions, when executed, causing the circuit to provide at least a physical configuration controller;
    receiving, by a physical configuration controller, a notification that includes data indicative of an event, the notification in response to a failure to receive, at the electronic device, an input acknowledging an occurrence of the event;
    determining, by the physical configuration controller, a second physical configuration of the housing logically associated with the event; and
    generating, by the physical configuration controller, an output for at least one of the number of actuateable elements.

12. The method of claim 11, further comprising:
    displacing at least one actuateable element to transition the housing from the first physical configuration to the second physical configuration.

13. The method of claim 11, further comprising:
    generating, by a communicably coupled device controller, the notification responsive to a failure to receive, at the electronic device, the user input acknowledging the occurrence of the event.

14. The method of claim 11 wherein receiving a notification that includes data indicative of an event includes receiving, by the physical configuration controller, a notification that includes data indicative of an event including least one of: an incoming telephone call received by the electronic device; an unopened voicemail message received by the electronic device; a missed telephone call received by the electronic device; an SMS message received by the electronic device; or a receipt of an email message by the electronic device.

15. The method of claim 11 wherein generating an output for at least one of the number of actuateable elements comprises:
    selecting, by the physical configuration controller, at least one of the actuateable elements to transition the device housing from the first physical configuration to the second physical configuration; and
    determining, by the physical configuration controller, a displacement for each of the selected actuateable elements, the displacement sufficient to transition the device housing from the first physical configuration to the second physical configuration.

16. The method of claim 11 wherein generating an output for at least one of the number of actuateable elements comprises:
    generating, by the physical configuration controller, an output for at least one of the number of actuateable elements each of the number of actuateable elements including at least one of: a linearly displaceable actuateable element; a shape memory alloy actuateable element; a piezo actuateable element, or a motorized actuateable element.

17. The method of claim 11, further comprising:
    receiving, by the physical configuration controller, one or more restoration signals; and
    transitioning, by the physical configuration controller, the housing from the second physical configuration to the first physical configuration responsive to the receipt of the one or more restoration signals.

18. The method of claim 11 wherein receiving a notification that includes data indicative of an event comprises:
    receiving, by the physical configuration controller, a plurality of notifications, each of the plurality of notifications including data indicative of a respective event, each of the plurality of notifications in response to a failure to receive, at the electronic device, an input acknowledging an occurrence of the respective event.

19. The method of claim 18 wherein generating an output for at least one of the number of actuateable elements comprises:
    generating a composite output for at least one of the number of actuateable elements, the composite output to transition the housing from the first physical configuration to a second physical configuration that is a composite of each of the second physical configurations logically associated with each respective one of the plurality of notifications.

20. The method of claim 18 wherein generating an output for at least one of the number of actuateable elements comprises:

sequentially generating an output for at least one of the number of actuateable elements, sequentially generated output to transition the housing from the first physical configuration through a sequence of second physical configurations logically associated with each respective one of the plurality of notifications.

21. A physically convertible portable cellular communication device, comprising:

a housing having an external surface;

a transceiver at least partially disposed in the housing; and an actuateable element integral with or coupled to the housing;

wherein:

a shape of at least a portion of the external surface of the housing is reversibly transformable between a first physical configuration and a second physical configuration; and in response to receipt of at least one signal, the transceiver is configured to cause the actuateable element to cause said portion of said external surface of the housing to transition from said first physical configuration to said second physical configuration, said second physical configuration being logically associated with said at least one signal received by said transceiver.

22. The device of claim 21 wherein the actuateable element comprises at least one of: a linearly displaceable actuateable element; an actuateable element formed at least in part using shape memory alloy; a piezo actuateable element, or a motorized actuateable element.

23. The device of claim 21 wherein the at least one signal includes at least one of: a signal indicative of incoming cellular telephone call; a signal indicative of a new voicemail; a signal indicative of a missed cellular telephone call; a signal indicative of a new incoming SMS message; or a signal indicative of a new incoming email message.

\* \* \* \* \*